United States Patent [19]
Whitney

[11] 3,965,602
[45] June 29, 1976

[54] ANIMAL IDENTIFICATION TAG
[75] Inventor: Maurice Aaron Whitney, Cody, Wyo.
[73] Assignee: Y-TEX Corporation, Cody, Wyo.
[22] Filed: Feb. 6, 1975
[21] Appl. No.: 547,479

[52] U.S. Cl. .................................................. 40/301
[51] Int. Cl.² ........................................... G09F 3/00
[58] Field of Search ...................... 40/300, 301, 302

[56] References Cited
UNITED STATES PATENTS

| | | | |
|---|---|---|---|
| 3,346,980 | 10/1967 | Wallace | 40/302 |
| 3,468,050 | 9/1969 | Pool | 40/302 |
| 3,512,289 | 5/1970 | Hayes | 40/301 |
| 3,595,201 | 7/1971 | Dumas | 40/301 X |
| 3,605,310 | 9/1971 | Brown | 40/301 |
| 3,867,777 | 2/1975 | Potter | 40/301 |
| 3,896,577 | 7/1975 | Hayes | 40/301 |

Primary Examiner—Louis G. Mancene
Assistant Examiner—John H. Wolff
Attorney, Agent, or Firm—Hume, Clement, Brinks, Willian, Olds & Cook, Ltd.

[57] ABSTRACT

The invention provides an improved animal identification tag for attachment to the ear of an animal, which stands up when attached to the ear to provide for improved readability, while reducing irritation. The tag has an information-carrying portion having a surface on which indicia may be placed, and a pin extending from the information-carrying portion. The end of the pin has laterally extending, flexible prongs forming a spear-shaped portion which passes through the ear of the animal and retains the tag in the ear. In order to reduce irritation which may be produced by the flexible prongs, at least two opposite prongs have tip portions which are curved downwardly away from the information-carrying portion so as to conform to the inner surface of the ear.

4 Claims, 5 Drawing Figures

ANIMAL IDENTIFICATION TAG

The present invention relates to an improved animal identification tag, and more specifically to an improved tag which, when attached to the ear of an animal, stands relatively immobile in a position generally perpendicular to the surface of the ear, while reducing irritation to the ear.

Animal identification tags are highly useful for a number of purposes. Such tags can be employed to identify animals along with their breed lines, weight, carcass, characteristics, physical condition, etc. Thus, such tags are a valuable tool in many areas of animal management, such as breeding, disease eradication, wildlife management, laboratory experimentation, etc.

A significant improvement in the field of animal identification tags has been the development of one-piece, flexible tags having an identification portion connected to a shaft which terminates in a spear-shaped portion. The spear-shaped portion is passed through the ear of an animal using a suitable tool, and is retained in the ear. Such a tag is described in U.S. Pat. No. 3,512,289, which is assigned to the assignee of this application. Another improvement in the field of animal identification tags has been the development of the so-called "stand-up" ear tag, as described herein.

With most ear tags, there is sometimes a problem of slow healing of the ear after insertion, together with irritation of the ear by the prongs of the spear head. While the "stand-up" type of tag promotes fast healing because it is relatively immobile after being mounted, the prongs nevertheless sometimes irritate the inside of the ear, which can weaken the mounting of the tag in the ear.

Generally, the present invention provides an improved animal identification tag for attachment to the ear of an animal, which comprises an information-carrying portion having a surface on which indicia may be placed and a pin or shaft extending from the information-carrying portion. The end of the pin has laterally extending flexible prongs, at least two of the prongs being oppositely disposed and having tip portions curved downwardly away from said information-carrying portion.

The invention, its construction and method of operation, together with the objects and advantages thereof, will be best understood by reference to the following detailed description, taken in conjunction with the drawings, in which.

Figure 1:
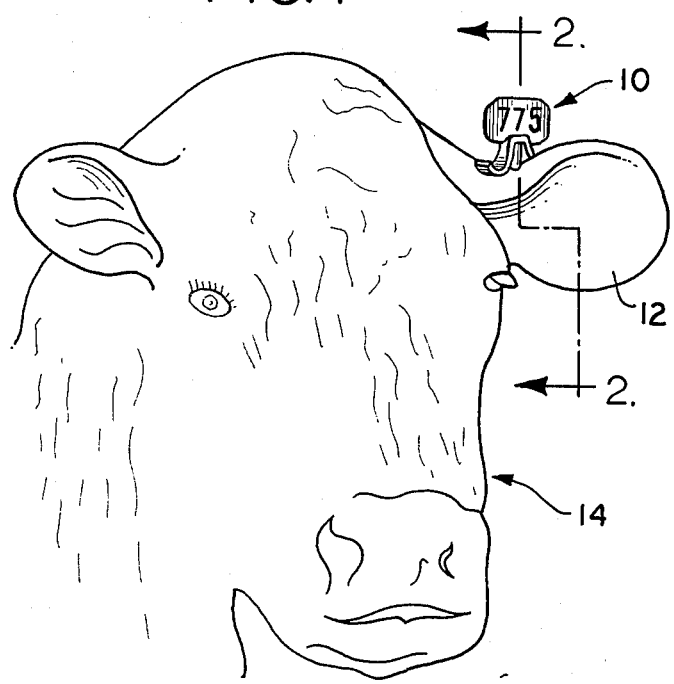
FIG. 1 is a perspective view of an ear tag embodying the present invention mounted in the ear of a steer.
Figure 2:
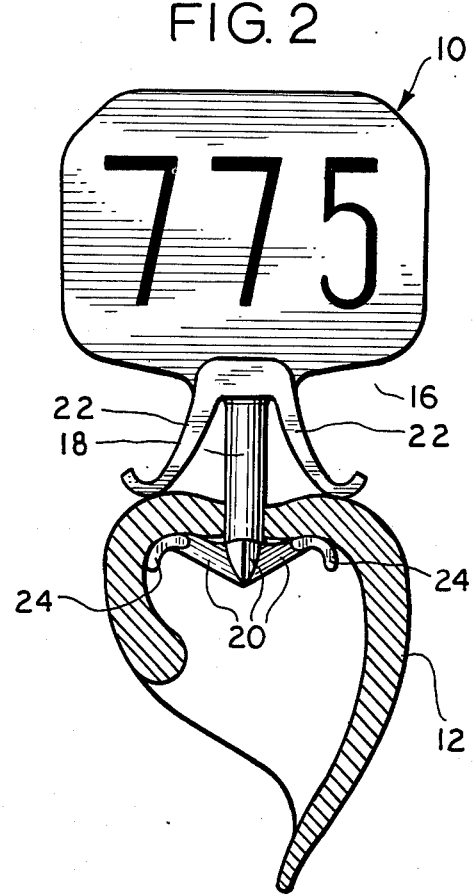
FIG. 2 is an elevation view of the device shown in FIG. 1, taken along line 2—2 thereof.

Referring to FIGS. 1 and 2, an ear tag embodying the present invention is generally indicated by reference numeral 10, and is shown mounted in the ear 12 of a steer 14. The tag 10 has a flat information-carrying portion 16, which may be of any desired shape. As may be seen particularly by reference to FIGS. 3 and 4, the information-carrying portion 16 is generally of a flat plate-like configuration, and information can be displayed on either side.

Extending outwardly from the information-carrying portion 16 is a pin or shaft 18. In this particular embodiment, the pin is parallel to the surfaces of the information-carrying portion 16, although other configurations may be employed, for example, as shown in the aforementioned U.S. Pat. No. 3,512,289. The pin 18 has four laterally extending, flexible prongs 20, which are inclined rearwardly toward the information-carrying portion 16, and which form a generally spear-shaped tip on the pin 18. The prongs 20 are mounted in a manner that permits them to be deflected rearwardly toward the pin 18 when the prongs 20 are passed through the ear of an animal, and to snap back into position after they have completed passage through the ear.

Figure 3:
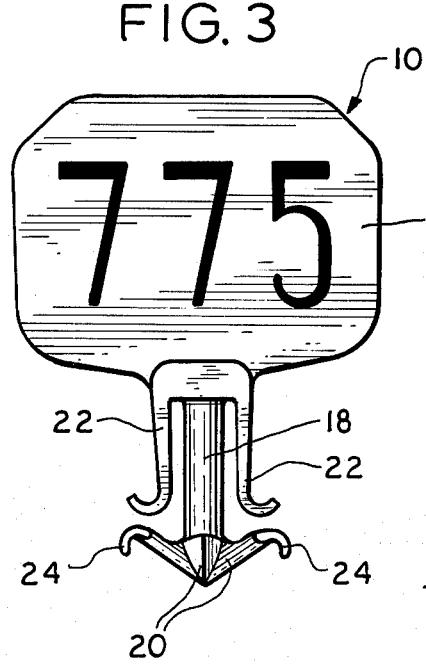
FIG. 3 is an elevation view of the ear tag of FIG. 1, shown out of engagement with the ear of an animal.
Figure 4:
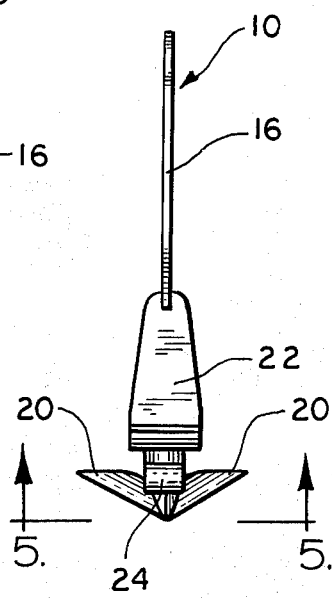
FIG. 4 is a side view of the device shown in FIGS. 1-3.
Figure 5:
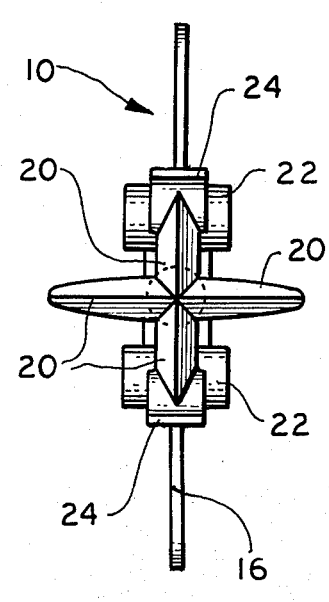
FIG. 5 is a bottom view of the device, taken along line 5—5 of FIG. 4.

Adjacent to the shaft 18 are a pair of flexible resilient support members 22, which are indicated in FIGS. 1 and 2 in their outwardly deflected position in contact with the ear 12, and in FIGS. 3-5 in their normal, non-deflected position as when the tag is not installed in an animal. In the preferred embodiment shown, the support members 22 are of J-shaped configuration, so that the rounded ends of the support members 22 can slide easily outwardly along the surface of the ear 12.

Referring to FIG. 2, it is seen that two oppositely disposed prongs 20 have curved tip portions 24, which are curved downwardly away from the information-carrying portion 16. It is also seen that the prongs 20 have relatively flat upper portions, so that the ear 12 is contacted by a flat surface. As can also be seen in FIG. 2, the downwardly curved tip portions 24 tend to conform to the interior surface of the ear 12, which could otherwise be irritated by the tips of the prongs 20. Irritation to the inside of the ear 12 is thus significantly reduced, and rapid healing results. Rapid healing is further promoted by the aforementioned flat upper portions of the prongs 24, and by the overall immobility of the tag 10, as movement of the tag also tends to irritate the wound. Because the tip portions 24 are preferably made of the same flexible material as the tag 10 itself, they do not increase the difficulty of installation of the tag.

In the preferred embodiment shown, the curved tip portions 24 are associated with prongs 20 which are parallel to the information-carrying portion 16. As shown in FIGS. 1 and 2, this configuration permits the indicia on the information-carrying portion 16 to face at a convenient angle to the steer 14 for high visibility. In addition, this configuration is readily adapted to conventional injection molding techniques.

Referring to FIG. 4, it will be seen that the tag 10 includes flexible J-shaped support members 22 which are tapered to be wider at their lower, curved portions than at their portions. This increased width at the portion where the J-shaped members 22 contact the outer surface of the ear 12 provides an increased supporting surface, and further aids in immobilizing the tag 10. The increased support provided by these tapered support members 22 also permits the use of large information-carrying portions 16, as the increased stability permits increased weight in this portion.

The tag 10 may be installed in the ear of an animal by use of a conventional tool, such as that illustrated in U.S. Pat. No. 3,512,289, which is assigned to the assignee of this application. The tag is inserted into the ear by first positioning it on the tool, and then forcing the piercing tip of the blade through the ear of the animal. As the prongs 20 pass through the opening, they are deflected rearwardly, but snap into position after having passed through the ear.

The ear tag 10 of the present invention may be made out of any suitable resilient material, and is preferably of unitary construction. The most preferred materials for making the tag 10 are resilient, flexible plastics, such as opaque polyurethane, polyethylene, polypropylene and the like. In addition to being flexible, these materials should be sufficiently tough to withstand hard usage.

Obviously, many modifications and variations of the present invention as hereinbefore set forth will occur to those skilled in the art, and it is intended to cover in the appended claims all such modifications and variations as fall within the true spirit and scope of the invention.

I claim:

1. An improved animal identification tag comprising: a flat information-carrying portion having a surface on which indicia may be placed; a pin extending outwardly from the edge of said information-carrying portion in a direction generally parallel to said surface; laterally extending flexible prongs on the end of said pin, at least two of said prongs being oppositely disposed and having tip portions curved downwardly away from said information-carrying portion; and a pair of flexible, resilient support members extending outwardly from said information-carrying portion adjacent to said pin, said support members being positioned to contact the surface of the ear of an animal when said prongs are passed through the ear.

2. The animal identification tag as defined in claim 1 wherein said tag is a unitary piece of flexible plastic material.

3. The animal identification tag as defined in claim 2 wherein said tag has four prongs.

4. The animal identification tag as defined in claim 2 wherein said prongs having curved tipped portions extend outwardly in a direction parallel to the surface of said information-carrying portion.

* * * * *